Oct. 12, 1937.  E. GAUDEFROY  2,095,864
DEVICE FOR STABILIZING AND ADJUSTING THE TENSION
OF THE SUSPENSION MEANS OF VEHICLES
Filed Oct. 31, 1935   3 Sheets—Sheet 1
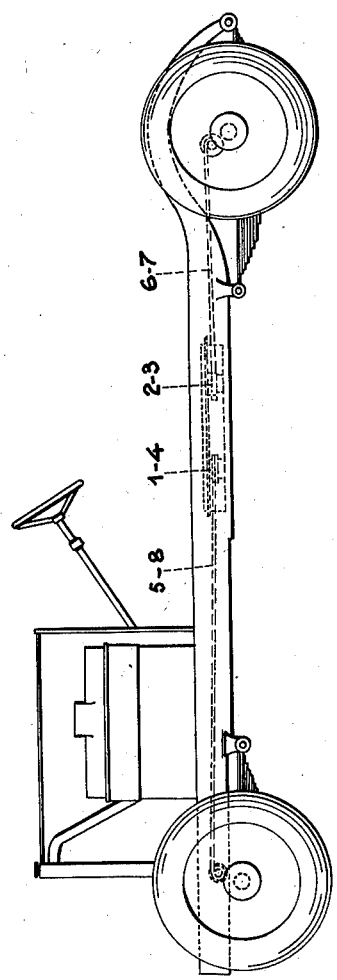
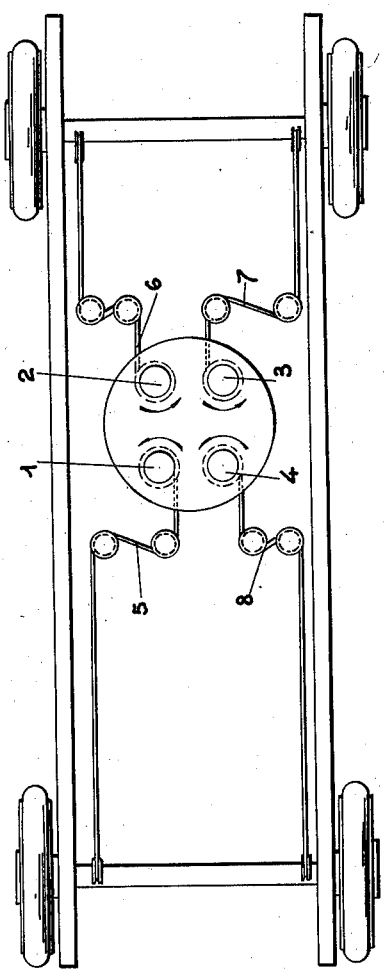

Oct. 12, 1937.   E. GAUDEFROY   2,095,864
DEVICE FOR STABILIZING AND ADJUSTING THE TENSION
OF THE SUSPENSION MEANS OF VEHICLES
Filed Oct. 31, 1935   3 Sheets-Sheet 2
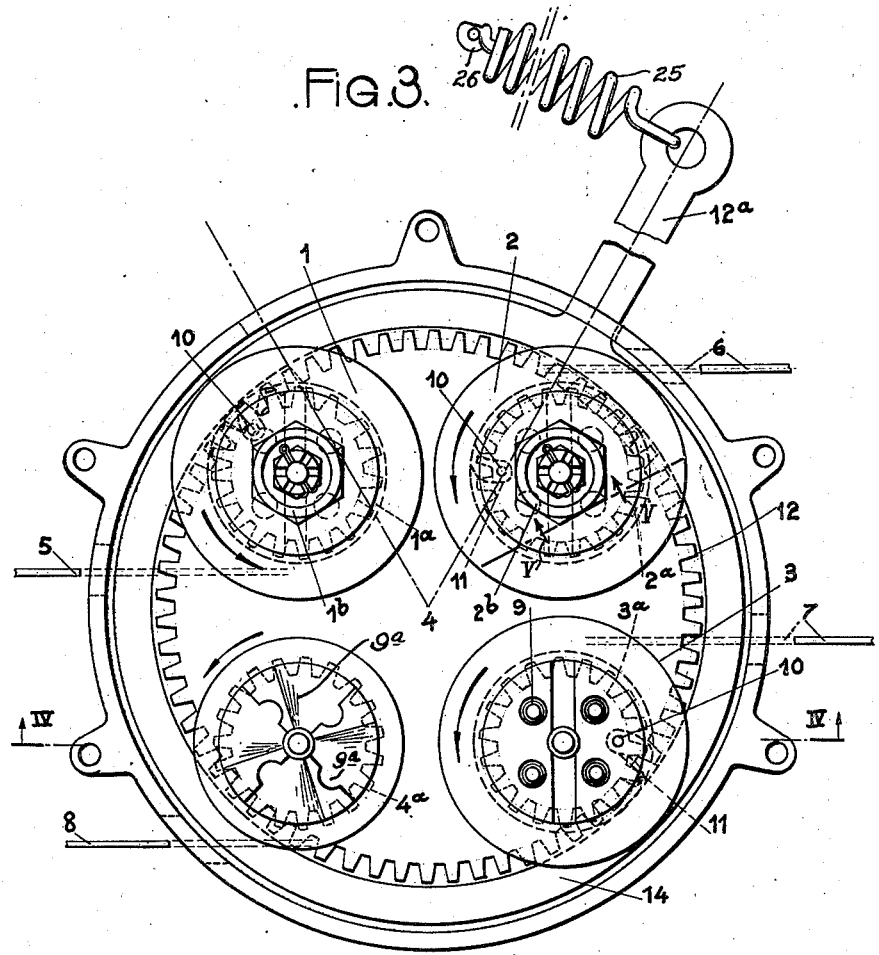

Patented Oct. 12, 1937

2,095,864

UNITED STATES PATENT OFFICE 2,095,864

DEVICE FOR STABILIZING AND ADJUSTING THE TENSION OF THE SUSPENSION MEANS OF VEHICLES

Emile Gaudefroy, Saclay, near Orsay, France

Application October 31, 1935, Serial No. 47,706
In France November 6, 1934

7 Claims. (Cl. 267—2)

Owing to the very important variations of the loads to be supported by vehicles, and particularly motor vehicles, the suspension means of these vehicles do not always react in satisfactory conditions. The suspension means of vehicles are designed for an average load, and the suspension is excellent only for this load. In all the other cases, the suspension is too hard or too resilient, notwithstanding the damping means usually employed. The variations of load are however unavoidable and often very important for vehicles employed for the transport of passengers and goods.

The present invention is adapted to remedy these inconveniences and relates to a device for stabilizing and adjusting the tension of the suspension means, such as the springs of a motor vehicle.

This device is mainly characterized by the fact that the axles of the vehicle are connected to the chassis by means allowing to initially compress the springs to a value corresponding to the load for which the vehicle has normally been designed, so that the suspension may act even for a small load in the same manner as for the normal load for which the springs have been designed.

In a form of carrying the invention into practice, the axles of the wheels are each connected by a pull or tension cable attached to the chassis of the vehicle, so that the suspension springs of each of the wheels should be compressed to a value corresponding to the normal load.

A convenient form of construction is characterized by the combination, in one and the same unit, with a main casing rigidly secured to the chassis of the vehicle, of four pulleys each co-axially connected to a gear, by a movement selecting device, the four gears being constantly in mesh with a corresponding toothed crown wheel.

With the device above defined can be combined damping means of any suitable type.

The invention further relates to other particular points which will appear from the following description with reference to the accompanying drawings, given by way of example only, in which:

Figs. 1 and 2 are a diagrammatic elevation and plan view showing a device according to the invention and fitted on a motor vehicle.

Fig. 3 is a detail plan view of the device, some parts being removed.

Fig. 4 is a section made according to line IV—IV of the preceding figure.

Figure 8:
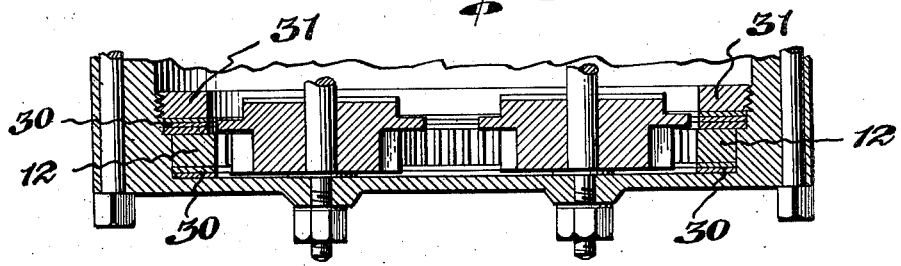

Fig. 8 corresponds to Figure 4, the device being provided with friction means.

The device forming the subject-matter of the invention, comprises four pulleys 1, 2, 3, and 4 on which are partially wound the ends of cables 5, 6, 7, and 8, the other ends of which are connected to the axles of the wheels of the vehicle as more particularly and diagrammatically illustrated in Figs. 1 and 2, intermediate guide pulleys being provided as shown in these figures.

Figure 5:
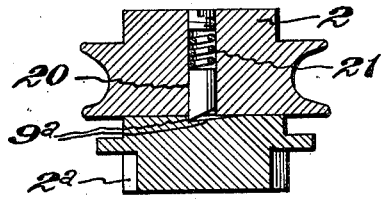
Fig. 5 is a partial section on line V—V of Figure 3.
Figure 6:
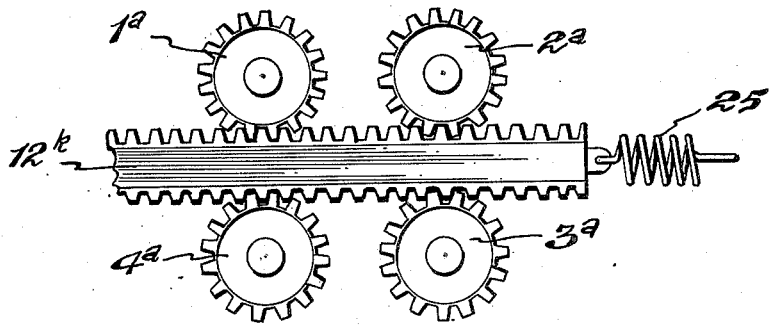
Fig. 6 shows a constructional form in which the toothed wheels are connected in rotation by a rack.

As will be more clearly seen in Figs. 4, 5, and 6 the pulleys 1, 2, 3, and 4 are co-axially connected to gears $1^a$, $2^a$, $3^a$, and $4^a$, respectively, through the medium of movement selecting devices of any suitable type. These movement selecting devices are constituted, in the example chosen, by small pistons 9 movable in translation in corresponding holes of the pulleys, and which are subjected to the action of springs, the ends of these pistons fitting upon the corresponding upper faces of gears $1^a$, $2^a$, $3^a$, and $4^a$, these faces being so formed as to constitute ratchet teeth.

The pulley 3 illustrated in Fig. 4 shows the means for securing the end of the corresponding cable 7, these means being constituted by a screw 10 for locking the end of the cable which is inserted in a corresponding housing or recess 11 of this pulley.

The various gears $1^a$, $2^a$, $3^a$, and $4^a$ constantly mesh with a common toothed crown wheel 12 which can be externally arranged as illustrated, or internally arranged.

Said gears might moreover be in alignment with a common rack.

The permitted direction of rotation of the pulleys relatively to the gears is indicated by arrows in full lines.

By acting on the hexagonal members $1^b$, $2^b$, $3^b$, and $4^b$, in the direction of these arrows, said members being angularly connected to the corresponding pulleys, it is possible to initially adjust the tension of cables 5, 6, 7, and 8 and, consequently, the compression of the suspension springs of the vehicle to a value corresponding to the load already defined.

The device being adjusted, the suspension of the vehicle behaves, even for a reduced load, always in the same manner. Thus in a turn, the body of the vehicle oscillates very slightly and slowly; the cables being on the inner side of the turn, have a tendency to take some slack, this causing an angular displacement of the corresponding pulleys, in a direction reverse to that indicated by the arrows. In these conditions, the corresponding gears actuate the toothed crown wheel 12, which transmits its movement to the other gears and pulleys, and their corresponding cables absorb the slack of the two first cables; there is always compensation.

The toothed crown wheel 12 can be provided with a projecting tail member 12$^a$ connected to a damping element such as a spring, so as to brake or check the displacement of this crown and, consequently, the displacements of the pulleys and cables.

Within the casing 1 might also be arranged a central damping device constituted in particular by friction discs and which would act for braking or checking the displacement of the pulleys.

It will be noted that the members 3$^b$ allowing the angular displacement of the pulleys for effecting the adjustment of the cables project outside a cap 15 of the casing 14, so as to facilitate the adjustment of the whole and, particularly, to remedy to the elongation of the cable caused by use.

It is obvious that the form of construction described and illustrated is given herein by way of indication only and not in a limiting sense. All changes or modifications, which do not alter in any way the main features set forth and the desired result, remain included in the scope of the present invention.

It will be noted that the gearing-down ratio of the device can be different for the front and rear springs. For that purpose, the pulleys on which the cables wind can have different diameters for the front and rear springs.

It will be seen that the angular connection between each pulley and the corresponding toothed wheel is ensured in one direction only due to a movement selecting means which is constituted by small pistons 9 forming pawls and which act in combination with teeth forming inclines 9$^a$. The small pistons 9 engage in corresponding holes 20 formed in the pulleys (the pulley 2 in the example of Figure 5). The said small pistons are subjected to the action of springs 21 so that the bevelled ends of these small pistons engage with the inclines 9$^a$ constituting ratchet teeth and which are formed on the toothed wheels.

In view of this arrangement, the angular connection between the pulleys and the toothed wheels is ensured in one direction only which permits the initial compression of each cable by the displacement of the corresponding pulley in the winding direction of the corresponding cable.

As is shown in Figure 3, the tail 12$^a$ rigid with the toothed crown wheel 12 is connected to one of the ends of a spring 25 while the other end is connected to a fixed point 26 the position of which may be regulated if desired.

The device being adjusted, the suspension of the vehicle operates even for a reduced load always in the same manner. Thus in a turn, the body of the vehicle inclines very slightly and slowly toward the exterior of the turn under the action of centrifugal force. The cables on the outer side of the turn have a tendency to slacken while the cables on the inner side of the turn are tightly stretched under the action of the inclination of the vehicle. The stretched cables, for example, the cables 8 and 7, are slightly unwound from the pulleys 3 and 4 thereby causing a displacement in rotation of these pulleys. By means of the small pistons 9 and the teeth 9$^a$, the toothed wheels 3$^a$ and 4$^a$ are driven by rotation, this rotation being transmitted to the toothed crown wheel 12 and the tension of the spring 25 is increased. The spring 25 therefore resists the inclination of the chassis of the vehicle and returns the device to its initial position on the cessation of the action of the centrifugal force created during the turn.

In order to increase the damping created by the spring 25, friction disks 30 may be used, as shown in Figure 3, which act on both sides of the toothed crown wheel 12. These disks 30 are held by a screwed ring 31.

Figure 7:
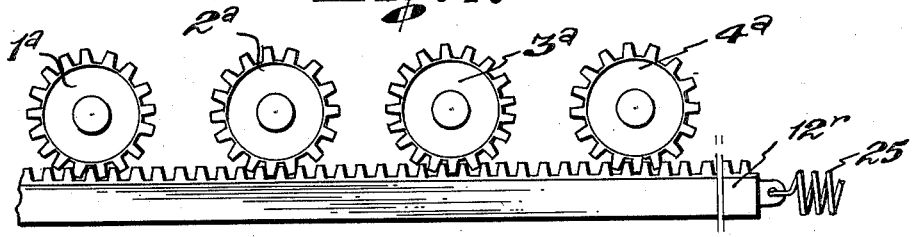
Fig. 7 shows a modification.

With regard to the rotation of the toothed wheels 1$^a$, 2$^a$, 3$^a$, and 4$^a$, a rack 12$k$ or 12$r$ as indicated in Figures 6 and 7 may be used instead of the toothed crown wheel 12. These constructional forms do not need a special description, the racks being subjected to the action of a spring 25.

What I claim as my invention and desire to secure by Letters Patent is:

1. In a device for stabilizing and adjusting the tension of the suspension means of a vehicle, said means being interposed between the chassis and the axles of the wheels of said vehicle, a main casing rigidly secured to the chassis of the vehicle, four pulleys journalled in said casing, a gear co-axial with each pulley, means for connecting each pulley to its corresponding gear for movement in one direction only, a toothed crown wheel with which said gears are constantly in mesh, four cables, means for connecting these cables to the corresponding axles and pulleys for initially compressing the suspension means to a value corresponding to the load for which the vehicle has been normally designed, in order that the suspension means may act, even for a small load, in the same manner as for the normal load for which said suspension means have been designed.

2. In a device for stabilizing and adjusting the tension of the suspension means of a vehicle, said means being interposed between the chassis and the axles of the wheels of said vehicle, a main casing rigidly secured to the chassis of the vehicle, pulleys journalled in said casing, the number of pulleys being equal to that of the wheels of the vehicle, gears journalled in said casing, the number of gears being equal to that of the wheels of the vehicle, each gear being co-axial with one of the corresponding pulleys, means for connecting each pulley to its corresponding gear for movement therewith in one direction only, a toothed crown wheel journalled in the casing and with which said gears are constantly meshing, said crown wheel having an arm, cables the number of which is equal to that of the wheels of the vehicle, means for connecting the various cables to the corresponding axles and pulleys, damping means for acting on the arm of the toothed wheel for checking the displacement of the latter, the cables being stretched for initially compressing the suspension means to a value corresponding to the load for which the vehicle has been normally designed, in order that the suspension means may act, even for a small load, in the same manner as for the normal load for which said suspension means have been designed.

3. In a device for stabilizing and regulating the tension of the suspension means of motor vehicles, the said means being interposed between the chassis and the axles of the wheels of said vehicle, a cable for each axle, means for connecting one of the ends of the cable to the corresponding axle, a shaft mounted on the chassis of the vehicle, a pulley for each cable, the said pulley being journalled on said shaft, means for connecting the other end of the said cable to the said corresponding pulley, means for rotating each pulley in the winding direction of the corresponding cable and checking any displacement of said pulley in the other direction, means for causing rotation of one of said pulleys to exert a rotational force in the opposite direction on a corresponding pulley on the other side of the longitudinal axis of the vehicle, whereby the rotation of the said pulleys and a partial winding of the cables is accomplished on displacement of the body of the vehicle and initial compression of the said suspension means to a desired value corresponding to the load for which the vehicle has been normally designed is effected.

4. In a device for stabilizing and regulating the tension of the suspension means of motor vehicles, the said means being interposed between the chassis and the axles of the wheels of said vehicle, two cables for each axle, secured to each axle on opposite sides of the longitudinal axis of the vehicle, means for connecting one of the ends of each cable to the corresponding axle, a pulley for each cable on the same side of the longitudinal axis of the vehicle, means for connecting the other ends of said cables to the corresponding pulleys, a shaft for each pulley, a gear on each shaft, movement selecting means for connecting in rotation, in one direction only, each pulley to its corresponding gear, means for connecting said gears in rotation, a spring acting in one direction on the last named means, means for acting externally on each pulley for permitting by the rotation of the said pulleys a partial winding of the cables and ensuring an initial compression of the said suspension means, the said spring acting in opposition to the rotation of the said pulleys caused by the oscillation of the chassis in a turn.

5. In a device for stabilizing and adjusting the tension of the suspension means of a vehicle, said means being interposed between the chassis and the axles of the wheels of said vehicle, a main casing rigidly secured to the chassis of the vehicle, pulleys journalled in said casing, the number of pulleys being equal to that of the wheels of the vehicle, gears journalled in said casing, the number of gears being equal to that of the wheels of the vehicle, each gear being coaxial with one of the corresponding pulleys, means for connecting each pulley to its corresponding gear for movement therewith in one direction only, a rack supported in the casing and with which said gears are constantly meshing, said rack having an arm, cables the number of which is equal to that of the wheels of the vehicle, means for connecting the various cables to the corresponding axles and pulleys, damping means for acting on the arm of the rack for checking the displacement of the latter, the cables being stretched for initially compressing the suspension means to a value corresponding to the load for which the vehicle has been normally designed, in order that the suspension means may act, even for a small load, in the same manner as for the normal load for which said suspension means have been designed.

6. The device as claimed in claim 2 in which there is a spring connected to the crown wheel and to a fixed part of the vehicle to oppose the movement of said crown wheel.

7. The device as claimed in claim 5 in which the damping means is a spring connected to the rack and to a fixed part of the vehicle to oppose the movement of said rack.

EMILE GAUDEFROY.